Patented Dec. 17, 1940

2,225,475

UNITED STATES PATENT OFFICE 2,225,475

SYSTEM FOR LANDING AIRCRAFT

Walter Max Hahnemann, Berlin, Germany, assignor to C. Lorenz Aktiengesellschaft, Berlin-Tempelhof, Germany, a company Application October 26, 1938, Serial No. 237,102
In Germany October 26, 1937

2 Claims. (Cl. 250—11)

It is well known in aircraft navigation to emit a club-shaped high frequency radiation obliquely upwards from a transmitting station, in order to produce a so-called glide path or slip way, that is, a zone of equal field intensity which aeroplanes are to follow when descending. Such glide paths are produced in general by means of arrangements operated on ultra-short waves and in which the club-shaped radiation is due to the fact that two radiations are emitted by the transmitting antenna, namely a direct radiation and a radiation which is reflected by the ground and therefore may be spoken of as indirect radiation. The field intensity at a definite point is then determined by two vectors, namely that of the direct radiation and the vector of the indirect radiation. The shape of the glide path thus depends upon the amplitude and the phase of the direct and the indirect radiations.

Figure 1:
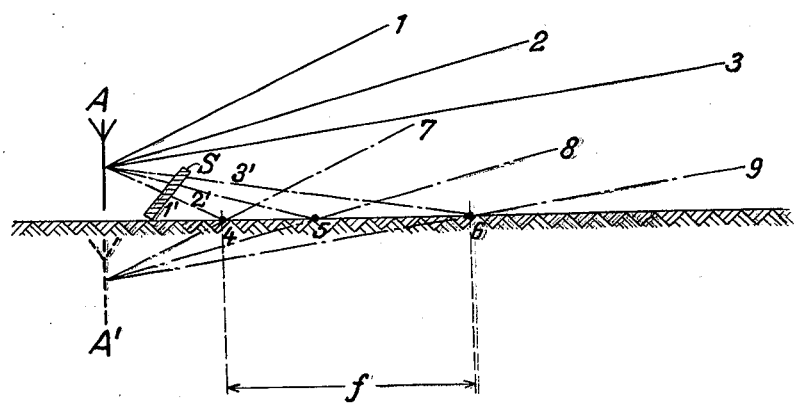
Figure 2:
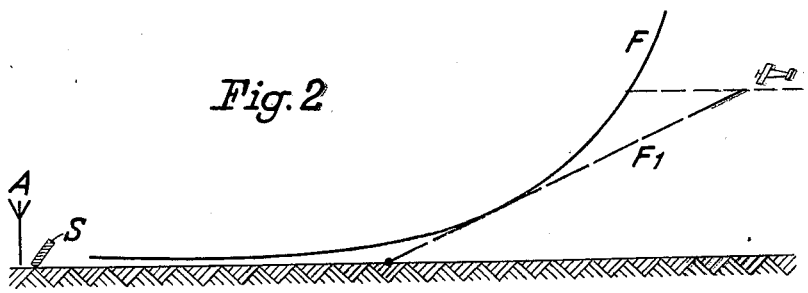
Figure 3:
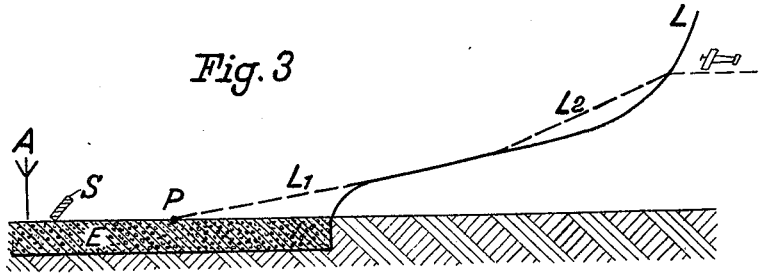

The invention has for its object to improve the shape of such glide paths and consists in certain features of novelty which will appear from the following description and be particularly pointed out in the appended claims, reference being had to the accompanying drawing, in which:

Fig. 1 is a diagrammatic elevation that illustrates the principle of radiation peculiar to the systems here concerned and also represents one embodiment of the invention; Figs. 2 and 3 are diagrammatic elevations which show examples of the result obtained by the invention.

From a transmitting antenna A, Fig. 1, direct beams 1, 2, 3 are emanating while at the same time downwardly directed beams 1', 2', 3' are emitted therefrom. The beams 1', 2', 3' impinging upon the earth's surface are reflected in the points 4, 5, 6 thereof. The so reflected or indirect beams are designated 7, 8, 9. In the manner customary in optics the beams 7, 8, 9 may be supposed to arrive from a mirror reflection A' of antenna A. The field intensity effective in each point of the space above ground is hence composed of the vector of the direct radiation and that of the indirect radiation.

Glide paths produced in this way are in general too steep at high altitudes where landing commences and too flat near the ground, as is represented by curve F, Fig. 2. A so shaped glide path is very disadvantageous, since the aeroplane, in order to land, has to begin with a steep descent and finally has to move in close proximity to the ground. This mode of landing, however, can be performed by only a small number of aeroplanes because the pilot, when flying along the flat part of curve F, must employ full motor power and will thus be brought to land with a dangerous speed. It is, therefore, sought to produce glide paths of a substantially plane shape, such as shown by line F1, Fig. 2. It will be seen that the glide path represented by line F1 does away with the steep descent peculiar to the curve F while enabling the aeroplane to land safely with throttled motors.

It has been found also that the glide paths are deformed in a disadvantageous manner if the landing ground comprises areas of different electric conductivity. For instance, this phenomenon has been observed in the case of landing grounds provided with ferro-concrete runways, these increasing the field intensity that prevails in small heights above the earth's surface.

This case is represented in Fig. 3. The landing ground is here provided with a ferro-concrete runway E into the respective end of which the glide path L extends, forming here a bulge, as shown. This bulge, striking the runway E almost at right angles, renders it impossible for the aeroplane safely to land on the runway E. Also here the invention will be useful.

The invention as applied to the case of Fig. 3 enables the bulge by which the glide path strikes the runway E to be replaced by a flat slip-way L1 so that the glide path so modified will cause aeroplanes to land at some place P. In addition, the invention allows of flattening also other parts of the glide path L, that is to say, parts located in substantial heights. For instance, a slip-way, such as represented by line L2, may be made to take the place of a bulge peculiar to the upper part of glide path L.

In order now to modify the glide paths F, L in a manner to obtain flat slip-ways, such as F1 or L1, L2, for instance, the invention proposes to adjust the indirect or reflected radiation, either as a whole or in part, quantitatively in relation to the direct radiation and in such manner that a predetermined glide path of equal field intensity is obtained. As a rule, such adjustment will consist in diminishing the reflected radiation, or part thereof, in relation to the direct radiation.

A possibility of adjusting the reflected radiation in this way consists in the provision of suitable obstacles, as screens or the like, interposed in the reflected radiation. The shape, size and position of such obstacles or screening means will enable to regulate the reflected radiation in the desired manner. The requisite dimensions and position of these obstacles may in each case be ascertained by calculus or empirically. One need only find out that section of the reflected radiation to which any undesired shaping of the glide path is due, in order then to conclude upon the necessary position and size of the said obstacles.

Let it be supposed that in Fig. 1 the section between the beams 1' and 3', that is, the distance f between the reflecting points 4, 6 causes the glide path, such for instance as F, Fig. 1, or L, Fig. 2, to be too steep. Then in accordance with the invention a screen S is interposed in the component radiation of this section, as shown in Fig. 1, this screen diminishing the reflected radiation as compared with the direct one. The extent to which this radiation section is reduced in efficiency is variable by choosing the size and position of screen S accordingly. Owing to diffraction at the edges of the screen still a certain amount of energy will enter the so screened section. According to whether a slight or a strong diffraction is permitted to take place, the screened radiation section will be influenced more or less effectually.

The screening means, as screen S, should be such that it shall not be caused by the high frequency radiation of the transmitter A to share in the oscillations thereof. To such end the screening means should be damped accordingly. For instance, a screen made of semi-conductive material or associated with separate damping means may be employed.

The invention is applicable to all the customary methods of obtaining glide paths of the said kind. For instance, it will be useful in arrangements having a vertical dipole, or arrangements in which directional antenna systems are provided. The invention is applicable also to devices in which two antenna fields are alternately keyed, that is to say, are alternately rendered effective and ineffective in order to indicate to the pilot not only the glide path but also the direction he has to follow. A known arrangement of this kind has a continuously fed vertical dipole and reflector antennae disposed on both sides thereof and adapted to be keyed alternately.

What is claimed is:

1. An arrangement for producing an aircraft landing guiding indication along a surface of equal field intensity and of substantially constant slope comprising radiating means for producing a radiation in space, part of which is transmitted in the direction of approach and a second part of which is transmitted in a direction to be reflected from the landing surface in said direction causing interference with said radiation in space, and attenuating means interposed in the path of said second part of said radiation between said radiating means and said landing surface for controlling said second part of said radiation to produce a substantially straight line landing course.

2. An arrangement for producing an aircraft landing guiding indication along a surface of equal field intensity and of substantially constant slope comprising radiating means for producing a radiation in space, part of which is transmitted in the direction of approach and a second part of which is transmitted in the direction to be reflected from the landing surface in said direction causing interference with said radiation in space, and attenuating means detuned with respect to said radiated energy interposed in the path of said second part of said radiation between said radiating means and said landing surface for controlling said second part of said radiation to produce a substantially straight line landing course.

WALTER MAX HAHNEMANN.